United States Patent
Gray-Woods

(10) Patent No.: US 8,069,884 B1
(45) Date of Patent: Dec. 6, 2011

(54) AUTOMOTIVE FLUID RESERVOIR

(76) Inventor: Curtis L. Gray-Woods, Los Angeles, CA (US)

( * ) Notice: Subject to any disclaimer, the term of this patent is extended or adjusted under 35 U.S.C. 154(b) by 559 days.

(21) Appl. No.: 12/290,517

(22) Filed: Oct. 31, 2008

Related U.S. Application Data

(63) Continuation of application No. 61/001,981, filed on Nov. 6, 2007.

(51) Int. Cl.
*B65B 1/30* (2006.01)
(52) U.S. Cl. ............................................. 141/95; 239/69
(58) Field of Classification Search .................. 141/95, 141/98, 65, 66, 192; 239/67, 69
See application file for complete search history.

(56) References Cited

U.S. PATENT DOCUMENTS

| | | | |
|---|---|---|---|
| 4,091,671 A * | 5/1978 | McLees | 73/313 |
| 5,626,170 A | 5/1997 | Parker | |
| 6,167,978 B1 * | 1/2001 | Smietanski | 180/69.4 |
| 6,247,509 B1 | 6/2001 | Rome et al. | |
| 6,959,740 B2 | 11/2005 | Few | |

* cited by examiner

*Primary Examiner* — Davis Hwu
(74) *Attorney, Agent, or Firm* — Emery L. Tracy

(57) ABSTRACT

An automotive fluid reservoir for storing and dispensing automotive fluids, such as motor oil and transmission fluid, into the engine and transmission of a vehicle is provided. The automotive fluid reservoir comprises a housing having a top side, a bottom side, a pair of end walls, a first side wall, and a second side wall. At least one compartment is formed in the housing with each compartment fluidly separate from any other compartment. A fluid receiving aperture is formed in the top side of the housing directly over each compartment for receiving fluid from an appropriate fluid container. At least one fluid output aperture is formed in one of the side walls of the housing with each fluid output aperture fluidly connected to at least one of the compartments. A length of tubing is connected to each of the fluid output apertures with each tubing extending from the appropriate fluid output aperture to the standard fluid reservoir within the vehicle. A dispensing mechanism dispenses the fluids from each compartment into the standard fluid reservoir in the vehicle.

18 Claims, 1 Drawing Sheet

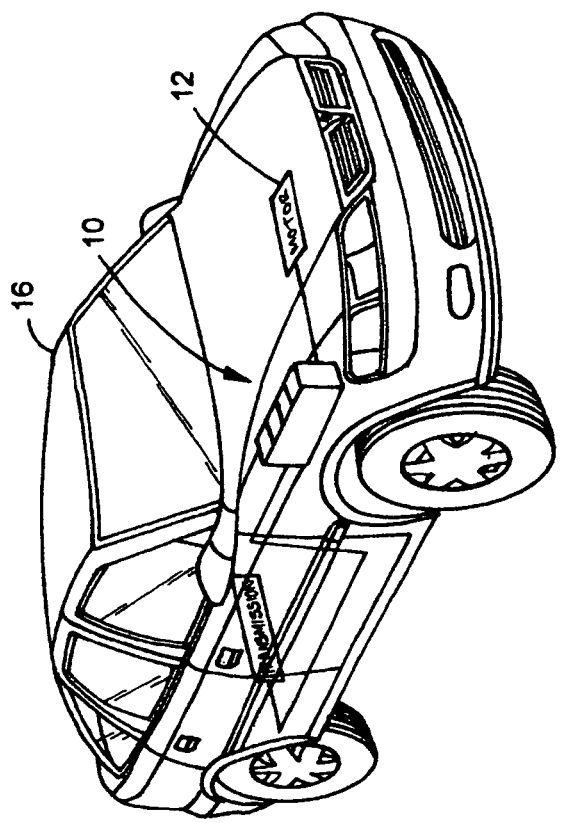
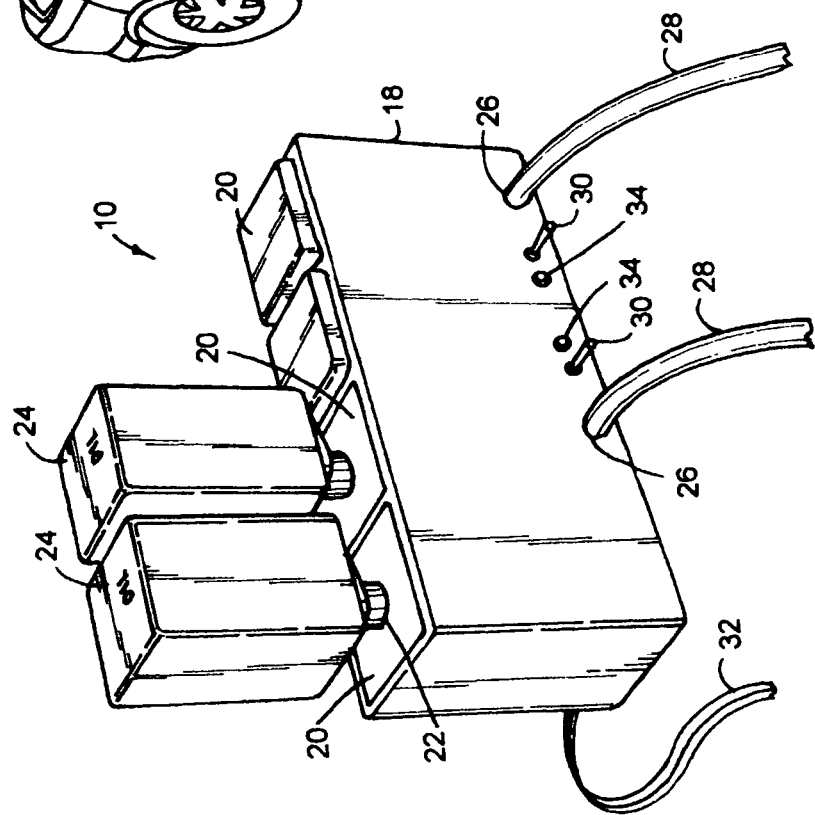

AUTOMOTIVE FLUID RESERVOIR

The present application is a continuation of provisional patent application Ser. No. 61/001,981, filed on Nov. 6, 2007, entitled "Motor Oil and Transmission Fluid Reservoir".

BACKGROUND OF THE INVENTION

1. Field of the Invention

This invention relates generally to an automotive fluid reservoir and, more particularly, the invention relates to an automotive fluid reservoir allowing storage of oil and transmission fluid containers and allowing drainage of those containers, leaving them totally empty of fluid and ready for recycling.

2. Description of the Prior Art

Automobile manufacturers and others stress the importance of changing oil every 3,000 miles. Changing the oil in regular intervals protects against engine failure and keeps the engine running smoothly. Since engines and their moving parts are made of metal, the oil in an engine acts as a lubrication buffer. After a period of time, the oil in an engine begins to get dirty by absorbing water, dust, and combustion byproducts and holding them in suspension. After a while, the oil can not hold any more particles so they remain in the engine, causing excess wear and tear.

Because engines operate at high temperatures, oil also undergoes thermal breakdown, making it less effective as a lubricant. If an engine does not have clean oil, sludge builds up, and if an engine does not have enough oil, engine failure can occur. A failing engine will "seize up" and begin hammering and knocking. Eventually, the engine will quit running and fixing the problem is expensive. A little planning and preparation can go a long way toward safe and happy motoring.

It is very important to inspect a vehicle's vital fluids, particularly the engine oil and the anti-freeze/coolant solution. The owner's manual provides the recommended grade and service classification of oil the best suits the vehicle. A proper coolant solution is important for hot weather protection. Also, checking transmission, brake, and power steering fluids are important and using the type of fluid recommended by the manufacturer, particularly with transmission fluid, is important. Unfortunately, many motorists do not know very much about cars and trucks, except how to drive them. Subsequently, there are many occasions where a motorist can inadvertently damage a vehicle because the vital fluids had not been checked.

SUMMARY

The present invention is an automotive fluid reservoir for storing and dispensing automotive fluids, such as motor oil and transmission fluid, into the engine and transmission of a vehicle. The automotive fluid reservoir comprises a housing having a top side, a bottom side, a pair of end walls, a first side wall, and a second side wall. At least one compartment is formed in the housing with each compartment fluidly separate from any other compartment. A fluid receiving aperture is formed in the top side of the housing directly over each compartment for receiving fluid from an appropriate fluid container. At least one fluid output aperture is formed in one of the side walls of the housing with each fluid output aperture fluidly connected to at least one of the compartments. A length of tubing is connected to each of the fluid output apertures with each tubing extending from the appropriate fluid output aperture to the standard fluid reservoir within the vehicle. A dispensing mechanism dispenses the fluids from each compartment into the standard fluid reservoir in the vehicle.

The present invention further includes a method for storing and dispensing automotive fluids, such as motor oil and transmission fluid, into the engine and transmission of a vehicle. The method comprises a housing having a top side, a bottom side, a pair of end walls, a first side wall, and a second side wall, forming at least one compartment in the housing with each compartment fluidly separate from any other compartment, forming a fluid receiving aperture in the top side of the housing directly over each compartment for receiving fluid from an appropriate fluid container, forming at least one fluid output aperture in one of the side walls of the housing, fluidly connecting each fluid output aperture to at least one of the compartments, connecting a length of tubing to each of the fluid output apertures, extending each tubing from the appropriate fluid output aperture to the standard fluid reservoir within the vehicle, and dispensing the fluids from each compartment into the standard fluid reservoir in the vehicle.

BRIEF DESCRIPTION OF THE DRAWINGS

FIG. 1 is a perspective view illustrating an automotive fluid reservoir, constructed in accordance with the present invention; and FIG. 2 is a perspective view illustrating the automotive fluid reservoir, constructed in accordance with the present invention, connected to a vehicle.

DETAILED DESCRIPTION OF THE PREFERRED EMBODIMENTS

As illustrated in FIGS. 1 and 2, the present invention is an automotive fluid reservoir, indicated generally at 10, for storing and dispensing automotive fluids, such as motor oil and transmission fluid, into the engine 12 and transmission 14 of an automobile 16. It should be noted that the automotive fluid reservoir of the present invention can be used on all types of vehicles including, but not limited to, automobiles, boats, aircraft, under the seat of a motorcycle, army tanks, etc.

The automotive fluid reservoir 10 of the present invention includes a housing 18 having a top side, a bottom side substantially opposite the top side, a pair of end walls, a first side wall, and a second side wall. The housing 18 has a plurality of fluidly separate compartments 20. In a preferred embodiment, the housing 18 has four (4) compartments 20 with three (3) of the compartments 20 dedicated to motor oil and one (1) of the compartments 20 dedicated to transmission fluid. Each compartment 20 has a fluid receiving aperture 22 formed in the top side for receiving fluid from a fluid container 24. The appropriate fluid container 24 is positioned in a generally upside down manner into the fluid receiving aperture 22 and feeds fluid into the compartment 20 as the fluid in the compartment 20 recedes.

The housing 18 of the automotive fluid reservoir 10 of the present invention further includes at least one fluid output aperture 26 formed in one of the side walls of the housing 18. In an embodiment of the present invention, the housing 18 includes two (2) fluid output apertures 26 with one fluid output aperture fluidly connected to the compartments 20 for holding motor oil and the other fluid output aperture fluidly connected to the compartment 20 holding transmission fluid. An appropriate length of tubing 28 is connected to each of the fluid output apertures 26. Each tubing 28 extends from the appropriate fluid output aperture 26 to the standard fluid reservoir within the vehicle 16. For instance, the motor oil tubing extends from the motor oil fluid output aperture to the motor oil reservoir within the vehicle 12 and the transmission fluid tubing extends from the transmission fluid output aperture to the transmission fluid reservoir within the vehicle 12.

In addition, the automotive fluid reservoir 10 of the present invention includes at least one manual switch 30 on one of the side walls of the housing 18 for manually transferring fluids from the compartments 20 into the appropriate reservoir in the vehicle 16. The automotive fluid reservoir 10 is electrically connected to the vehicle's power source and onboard computer via power/computer wires 32, as will be described in further detail below. It should be noted that the automotive fluid reservoir 10 can also be mechanical such as operation by the fan belt, etc.

The automotive fluid reservoir 10 of the present invention is designed for the storage of motor oil and transmission fluid containers 24 and to allow complete drainage of those containers 24, leaving the containers 24 totally empty of fluid and ready for recycling. The automotive fluid reservoir 10 can be stored in the trunk of the vehicle 16 or wherever there is space to place it. The benefit of the automotive fluid reservoir 10 is that upon loss of those fluids from the engine 12 or transmission 14, the reserve fluid can be used to top off and allow for continued minimal operation of vehicle 16 until regular maintenance can be performed (i.e., oil change or transmission fluid replacement). The automotive fluid reservoir 10 enables the operator of the vehicle to operate safely but requiring the actual maintenance to be performed.

Although there are no restrictions on the size and shape of the automotive fluid reservoir 10 of the present invention, currently the automotive fluid reservoir 10 is designed to allow for two (2) to three (3) quarts of oil and one (1) quart of transmission fluid to fit comfortably inside. Once the automotive fluid reservoir 10 is installed and the vehicle 16 is being driven, if the need arises for additional fluid to be added, an indicator light 34 on the housing 18 or within the vehicle 16 illuminates. When the indicator light 34 comes on, the operable switch 30 can be maneuvered to disburse the amount of fluid needed at that time alleviating the need to open a bottle of fluid and ensuring the fluid is supplied to the compartment 20 in a clean and efficient manner without spillage and a funnel and is an effective way to change the oil and filter.

The appropriate tubing 28, as described above, is attached to the bottom of the compartments 20 of the housing 18 of the automotive fluid reservoir 10 of the present invention. The operator places the tubing 28 into the open end of the motor oil or transmission fluid of the vehicle 16. The fluid then flows from the automotive fluid reservoir 10 and empties into the needed receptacle. After disbursement, the operator should always check the level of fluid on the dipstick, whether, oil or transmission, to ensure manufacturer's specifications. A skilled mechanic can actually attach the tubing 28 directly to the transmission or oil chamber to make the need for manual intervention unnecessary or use a separate adapter.

In a further embodiment, the automotive fluid reservoir of the present invention can include a sensor operating in conjunction with the vehicle's computer. When the fluid level is below normal, the sensor indicates this and then, overriding the manual switch 30, automatically disburses the appropriate fluid from the appropriate compartment 20 in the housing 18. The automotive fluid reservoir 10 can be customized for fit and for all types of vehicle fluids such as antifreeze or brake fluid that the consumer wants to accommodate. Additionally, OEM dipsticks having sensors to alert the vehicle operator of fluid levels below normal will be part of the package.

The automotive fluid reservoir 10 of the present invention provides motorists ease of use, low maintenance, and peace of mind in an emergency-type situation. The automotive fluid reservoir 10 is also adaptable and movable from one vehicle to another. The advantages afforded by the automotive fluid reservoir 10 are most useful for motorists.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. An automotive fluid reservoir for storing and dispensing automotive fluids, such as motor oil and transmission fluid, into the engine and transmission of a vehicle, the automotive fluid reservoir comprising:
    a housing having a top side, a bottom side, a pair of end walls, a first side wall, and a second side wall;
    at least one compartment formed in the housing, each compartment fluidly separate from any other compartment;
    a fluid receiving aperture formed in the top side of the housing directly over each compartment for receiving fluid from an appropriate fluid container;
    at least one fluid output aperture formed in one of the side walls of the housing, each fluid output aperture fluidly connected to at least one of the compartments;
    a length of tubing is connected to each of the fluid output apertures, each tubing extending from the appropriate fluid output aperture to the standard fluid reservoir within the vehicle;
    a manual switch for manually dispensing the fluids from each compartment into the standard fluid reservoir in the vehicle; and
    a sensor operating in conjunction with a vehicle computer such that when a fluid level is below normal, the sensor indicates this and then, overriding the manual switch, automatically disburses the appropriate fluid from the appropriate compartment in the housing.

2. The automotive fluid reservoir of claim 1 wherein the housing has four (4) compartments with three (3) of the compartments dedicated to motor oil and one (1) of the compartments dedicated to transmission fluid.

3. The automotive fluid reservoir of claim 1 wherein an appropriate fluid container is positioned in an upside down manner into the fluid receiving aperture and feeds fluid into the compartment as the fluid in the compartment recedes.

4. The automotive fluid reservoir of claim 1 wherein the housing includes two (2) fluid output apertures with one fluid output aperture fluidly connected to the compartments for holding motor oil and the other fluid output aperture fluid connected to the compartment holding transmission fluid.

5. The automotive fluid reservoir of claim 1 wherein the tubing includes a motor oil tubing extending from a motor oil fluid output aperture to a motor oil reservoir within the vehicle and a transmission fluid tubing extending from the transmission fluid output aperture to a transmission fluid reservoir within the vehicle.

6. The automotive fluid reservoir of claim 1 wherein the manual switch is positioned on one of the side walls of the housing for manually releasing fluids from each compartment into the appropriate reservoir in the vehicle.

7. The automotive fluid reservoir of claim 1 wherein the housing is electrically connected to a vehicle power source and a vehicle onboard computer.

8. The automotive fluid reservoir of claim 7 and further comprising:
   an indicator light mounted on the housing or within the vehicle for indicating the need for additional fluid.

9. The automotive fluid reservoir of claim 1 wherein the automotive fluid reservoir holds approximately two (2) to three (3) quarts of oil and approximately one (1) quart of transmission fluid to fit comfortably inside.

10. A method for storing and dispensing automotive fluids, such as motor oil and transmission fluid, into the engine and transmission of a vehicle, the method comprising:
    providing a housing having a top side, a bottom side, a pair of end walls, a first side wall, and a second side wall;
    forming at least one compartment in the housing, each compartment fluidly separate from any other compartment;
    forming a fluid receiving aperture in the top side of the housing directly over each compartment for receiving fluid from an appropriate fluid container;
    forming at least one fluid output aperture in one of the side walls of the housing;
    fluidly connecting each fluid output aperture to at least one of the compartments;
    connecting a length of tubing to each of the fluid output apertures;
    extending each tubing from the appropriate fluid output aperture to the standard fluid reservoir within the vehicle;
    dispensing the fluids from each compartment into the standard fluid reservoir in the vehicle; and
    operating a sensor in conjunction with a vehicle computer such that when a fluid level is below normal, the sensor indicates this and then, overriding a manual switch, automatically disburses the appropriate fluid from the appropriate compartment in the housing.

11. The method of claim 10 and further comprising:
    forming four (4) compartments in the housing with three (3) of the compartments dedicated to motor oil and one (1) of the compartments dedicated to transmission fluid.

12. The method of claim 10 and further comprising:
    positioning an appropriate fluid container in an upside down manner into the fluid receiving aperture; and
    feeding fluid into the compartment as the fluid in the compartment recedes.

13. The method of claim 10 wherein the housing includes two (2) fluid output apertures with one fluid output aperture fluidly connected to the compartments for holding motor oil and the other fluid output aperture fluid connected to the compartment holding transmission fluid.

14. The method of claim 10 and further comprising:
    extending a motor oil tubing from a motor oil fluid output aperture to a motor oil reservoir within the vehicle; and
    extending a transmission fluid tubing from the transmission fluid output aperture to a transmission fluid reservoir within the vehicle.

15. The method of claim 10 and further comprising:
    positioning a manual switch on one of the side walls of the housing; and
    manipulating the switch for manually releasing fluids from each compartment into the appropriate reservoir in the vehicle.

16. The method of claim 10 and further comprising:
    electrically connecting the housing to a vehicle power source and a vehicle onboard computer.

17. The method of claim 16 and further comprising:
    mounting an indicator light on the housing or within the vehicle for indicating the need for additional fluid.

18. An automotive fluid reservoir for storing and dispensing automotive fluids, such as motor oil and transmissin fluid, into the engine and transmission of a vehicle, the automotive fluid reservoir comprising:
    a housing having a top side, a bottom side, a pair of end walls, a first side wall, and a second side wall;
    at least one motor oil compartment formed in the housing;
    at least one transmission fluid compartment formed in the housing;
    a motor oil receiving aperture formed in the top side of the housing directly over each motor oil compartment for receiving motor oil from an appropriate motor oil container;
    a transmission fluid receiving aperture formed in the top side of the housing directly over each transmission fluid compartment for receiving transmission fluid from an appropriate transmission fluid container;
    a motor oil fluid output aperture formed in one of the side walls of the housing, the motor oil fluid output aperture fluidly connected to each of the motor oil compartments;
    a transmission fluid output aperture formed in one of the side walls of the housing, the transmission fluid output aperture fluidly connected to each of the transmission fluid compartments;
    a length of tubing is connected to each of the fluid output apertures, each tubing extending from the appropriate fluid output aperture to the standard fluid reservoir within the vehicle;
    an indicator light mounted on the housing or within the vehicle for indicating the need for additional fluid; and
    a sensor operating in conjunction with a vehicle computer such that when a fluid level is below normal, the sensor indicates this and then, overriding a manual switch, automatically disburses the appropriate fluid from the appropriate compartment in the housing; and
    wherein an appropriate fluid container is positioned in an upside down manner into the fluid receiving aperture and feeds fluid into the compartment as the fluid in the compartment recedes.

\* \* \* \* \*